(12) United States Patent
Im et al.

(10) Patent No.: US 12,269,128 B2
(45) Date of Patent: Apr. 8, 2025

(54) STAINLESS STEEL FLUX CORED WIRE FOR MANUFACTURING LNG TANK

(71) Applicant: ESAB SEAH CORP., Gyeongsangnam-do (KR)

(72) Inventors: Hee Dae Im, Gyeongsangnam-do (KR); Chang Hyun Choi, Gyeongsangnam-do (KR); Woong Kil, Gyeongsangnam-do (KR)

(73) Assignee: ESAB SEAH CORP., Gyeongsangnam-do (KR)

( * ) Notice: Subject to any disclaimer, the term of this patent is extended or adjusted under 35 U.S.C. 154(b) by 111 days.

(21) Appl. No.: 17/752,930

(22) Filed: May 25, 2022

(65) Prior Publication Data
US 2022/0281037 A1 Sep. 8, 2022

Related U.S. Application Data

(63) Continuation of application No. PCT/KR2020/016749, filed on Nov. 25, 2020.

(30) Foreign Application Priority Data

Nov. 26, 2019 (KR) .......................... 10-2019-0153514

(51) Int. Cl.
| | | |
|---|---|---|
| *B23K 35/00* | (2006.01) | |
| *B23K 35/02* | (2006.01) | |
| *B23K 35/30* | (2006.01) | |
| *C22C 38/00* | (2006.01) | |
| *C22C 38/02* | (2006.01) | |
| *C22C 38/42* | (2006.01) | |
| *C22C 38/44* | (2006.01) | |
| *C22C 38/48* | (2006.01) | |
| *C22C 38/58* | (2006.01) | |

(52) U.S. Cl.
CPC ...... *B23K 35/0266* (2013.01); *B23K 35/3086* (2013.01); *C22C 38/001* (2013.01); *C22C 38/002* (2013.01); *C22C 38/02* (2013.01); *C22C 38/42* (2013.01); *C22C 38/44* (2013.01); *C22C 38/48* (2013.01); *C22C 38/58* (2013.01)

(58) Field of Classification Search
CPC ............. B23K 35/0261–0266; B23K 35/3086; C22C 38/001; C22C 38/002; C22C 38/02; C22C 38/42; C22C 38/44; C22C 38/48; C22C 38/58
USPC .................................................. 219/145.22
See application file for complete search history.

(56) References Cited

U.S. PATENT DOCUMENTS

| | | | |
|---|---|---|---|
| 2008/0093352 A1* | 4/2008 | Jang ................... | B23K 35/3053 |
| | | | 219/145.22 |
| 2011/0062133 A1* | 3/2011 | Inoue .................. | B23K 35/308 |
| | | | 219/145.22 |
| 2012/0055903 A1 | 3/2012 | Izutani | |
| 2016/0121433 A1* | 5/2016 | Miyata .................... | C22C 19/05 |
| | | | 219/145.22 |
| 2018/0221997 A1 | 8/2018 | Schweisstech | |
| 2020/0230733 A1* | 7/2020 | Mukai .................. | B23K 35/383 |
| 2021/0086314 A1* | 3/2021 | Sorrentino ............. | C22C 38/44 |
| 2022/0193833 A1* | 6/2022 | Mukai ................ | B23K 35/3033 |

FOREIGN PATENT DOCUMENTS

| | | | | |
|---|---|---|---|---|
| CN | 106736032 A | * | 5/2017 | ......... B23K 35/3086 |
| CN | 107971657 A | | 5/2018 | |
| CN | 111112876 A | * | 5/2020 | ......... B23K 35/0266 |
| JP | 11197883 A | | 7/1999 | |
| JP | 2000117488 A | | 4/2000 | |
| JP | 2000-343274 A | | 12/2000 | |
| JP | 2000343277 A | | 12/2000 | |
| JP | 2002001504 A | | 1/2002 | |
| JP | 2007160314 A | * | 6/2007 | |
| JP | 2007203350 A | | 8/2007 | |
| JP | 2007229781 A | | 9/2007 | |
| JP | 2010500178 A | | 6/2010 | |
| JP | 2019093428 A | | 6/2019 | |
| KR | 10-0925321 B1 | | 11/2009 | |
| KR | 10-2015-0074937 A | | 7/2015 | |
| KR | 10-2016-0093821 A | | 8/2016 | |
| KR | 1020180076088 A | | 7/2018 | |
| KR | 10-2018-0108730 A | | 10/2018 | |
| KR | 20190017413 A | * | 2/2019 | |
| KR | 1020190087846 A | | 7/2019 | |
| WO | WO-2015005002 A1 | * | 1/2015 | ............. B23K 25/00 |
| WO | WO-2019102932 A1 | * | 5/2019 | ......... B23K 35/0266 |

OTHER PUBLICATIONS

International Search Report and Written Opinion for International Application No. PCT/KR2020/016750 dated Feb. 24, 2021, 5 pages.
International Search Report and Written Opinion for International Application No. PCT/KR2020/016751 dated Feb. 24, 2021, 6 pages.
Extended European Search Report for European Application No. 20892161.9 dated Jul. 12, 2023, 6 pages.
Notice of Reason for Rejection for Japanese Application No. 2022-531395 mailed Aug. 1, 2023 with English translation, 18 pages.

(Continued)

*Primary Examiner* — Kiley S Stoner
(74) *Attorney, Agent, or Firm* — Edell, Shapiro & Finnan, LLC

(57) ABSTRACT

Provided is a stainless steel flux-cored wire for manufacturing an LNG tank. From the stainless steel flux-cored wire, it is possible to obtain a weld metal having excellent tensile strength and impact value by adjusting the contents of Mn, Mo, and Cr. The stainless steel flux-cored wire is applicable to welding of 9% nickel steel, high manganese steel, and stainless steel materials and can provide a weld metal having excellent cryogenic toughness in a weld zone because the contents of Mn, Mo, and Cr are adjusted.

7 Claims, No Drawings

(56) References Cited

OTHER PUBLICATIONS

First Office Action for Chinese Patent Application No. 202080082962.X dated Sep. 9, 2023 with machine translation, 13 pages.
Notice of Reason for Rejection for Japanese Application No. 2022-532014 mailed Aug. 22, 2023 with English translation, 11 pages.
Notice of Reason for Rejection for Japanese Application No. 2022-531529 mailed Aug. 22, 2023 with English translation, 12 pages.
International Search Report for International Application No. PCT/KR2020/016749 dated Feb. 3, 2021, 4 pages.
Official Action—Final Notice of Reason for Rejection for Japanese Patent Application No. 2022-531395, mailed Apr. 3, 2024 with English translation, 6 pages.

\* cited by examiner

STAINLESS STEEL FLUX CORED WIRE FOR MANUFACTURING LNG TANK

TECHNICAL FIELD

The present invention relates to a stainless steel flux-cored wire for manufacturing an LNG tank.

BACKGROUND

Liquid gases such as liquefied natural gas (LNG) having a boiling point of −164° C.), liquefied oxygen having a boiling point of −183° C., liquid nitrogen having a boiling point of −196° C., etc. require cryogenic storage. Therefore, to store these gases, a structure such as a pressure vessel made of a material having sufficient toughness and strength at cryogenic temperatures is required.

As a material usable at a low temperature in a liquefied gas atmosphere, a Cr—Ni-based stainless alloy, 9% Ni steel, and 5000-series aluminum alloy have been commonly used. However, in the case of using aluminum alloy, there are problems in that the alloy cost is high, the design thickness of the structure is large due to low strength, and the use is limited due to poor weldability. Cr—Ni-based stainless steel and 9% Ni steel overcome the problem of low strength of aluminum but have been problematic in application due to increase in manufacturing cost because expensive nickel needs to be included.

In addition, as another technique for structural steel used in liquefied gases, so-called nickel-free (Ni-free) high-manganese steel that is completely free of nickel has been used. However, these techniques have problems in that cost increases and load to heat treatment facility increases due to an increase in the number of heat treatment cycles. Accordingly, as disclosed in Korean Patent No. 10-135843, a technology for securing cryogenic toughness by using austenite as the main tissue instead of ferrite was developed.

The conventional wire used to weld such structural steel has been developed to be selectively applicable to 9% Ni steel or stainless alloy or high manganese steel according to the physical properties of the structural steel in order to satisfy the strength and impact resistance value of the structure after welding. However, when the application is limited according to the material of the structural steel, confusion may occur in the work process, and there is a disadvantage in terms of economic aspects. Accordingly, there is a need to develop a welding material that can be welded without restrictions according to the materials of structural steel members and which provides excellent cryogenic toughness to the welded part.

SUMMARY

The objective of the present invention is to provide a stainless-steel flux-cored wire for manufacturing an LNG tank, the wire having suitable physical properties required for an LNG tank.

The present invention relates to a stainless steel flux-cored wire for manufacturing an LNG tank and, more particularly, relates to a stainless steel flux-cored wire for manufacturing an LNG tank, the wire being configured such that the contents of Mn, Cr, and Mo are adjusted as desired, the wire being able to be used for obtaining a weld metal having excellent strength and cryogenic impact toughness. In example embodiments, the invention provides:

an alloy flux-cored wire having an alloy sheath filled with flux, the wire being configured such that a wire composition including a sheath component and a flux component embedded in the sheath component comprises, with respect to the total weight of the flux-cored wire, 6.0 to 15.0 wt % of Ni, 13.0 to 25.0 wt % of Cr, 1.0 to 10.0 wt % of Mn, 5.0 wt % or less (except for 0 wt %) of Mo, and 0.05 to 1.0 wt % of Si, with respect to the total weight of the flux-cored wire, wherein the content of C is limited to 0.5 wt % or less (except for 0 wt %), the total content of P and S is limited to 0.1 wt % or less (except for 0 wt %), at least one of $SiO_2$, $TiO_2$, and $ZrO_2$ is included in an amount of 5.0 to 18.0 wt %, at least one of $Na_2O$ and $K_2O$ is included in an amount of 0.1 to 1.0 wt %, the balance includes Fe and unavoidable impurities, and the alloy flux-cored wire is a stainless-steel flux-cored wire for manufacturing an LNG tank, satisfying the following [Relational Expression 1]:

$$\{4(Na_2O+K_2O)\}/\{0.5(TiO_2+SiO_2)+0.2(ZrO_2)\}<0.5 \quad \text{[Relational Expression 1]}$$

In order to accomplish the above objective, the present invention provides an alloy flux-cored wire having an alloy sheath filled with flux, a wire composition including a sheath component and a flux component embedded in the sheath component comprises, with respect to the total weight of the flux-cored wire, 6.0 to 15.0 wt % of Ni, 13.0 to 25.0 wt % of Cr, 1.0 to 10.0 wt % of Mn, and 0.05 to 1.0 wt % of Si, 0.5 wt % or less (except for 0 wt %) of C, wherein the total content of P and S is limited to 0.1 wt % or less (except for 0 wt %), at least one of $SiO_2$, $TiO_2$, and $ZrO_2$ is contained in an amount of 5.0 to 18.0 wt %, at least one of $Na_2O$ and $K_2O$ is contained in an amount of 0.1 to 1.0 wt %, at least one element selected from the group consisting of Mo, W, and Nb is contained in an amount of 0.1 to 5.0 wt %, the balance is Fe and unavoidable impurities, and the alloy flux-cored wire is a stainless-steel flux-cored wire for manufacturing an LNG tank, satisfying the following [Relational Expression 1]:

$$\{4(Na_2O+K_2O)\}/\{0.5(TiO_2+SiO_2)+0.2(ZrO_2)\}<0.5 \quad \text{[Relational Expression 1]}$$

An alloy flux-cored wire having an alloy sheath filled with flux, wherein a deposited metal obtained from the flux-cored wire comprises:

8.0 to 14.0 wt % of Ni, 15.0 to 23.0 wt % of Cr, 1.0 to 8.0 wt % of Mn, 4 wt % or less (except for 0 wt %) of Mo, and 0.05 to 1.0 wt % of Si, wherein the total content of C and N is limited to 0.01 to 0.5 wt %, the total content of P and S is limited to 0.1 wt % or less (except for 0 wt %), the balance includes Fe and unavoidable impurities, and the alloy flux-cored wire is a stainless-steel flux-cored wire for manufacturing an LNG tank, satisfying the following [Relational Expression 2]:

$$\{Cr+Mo\}/\{Ni+Mn+30(C+N)\}>1. \quad \text{[Relational Expression 2]}$$

The present invention provides an alloy flux-cored wire having an alloy sheath filled with flux, wherein a deposited metal obtained from the flux-cored wire comprises 8.0 to 14.0 wt % of Ni, 15.0 to 23.0 wt % of Cr, 1.0 to 8.0 wt % of Mn, and 0.05 to 1.0 wt % of Si, wherein the total content of C and N is limited to 0.01 to 0.5 wt %, the total content of P and S is limited to 0.1 wt % or less (except for 0 wt %), at least one element (Q) selected from the group consisting of Mo, W, and Nb is contained in an amount of 0.1 to 4.0 wt %, the balance includes Fe and unavoidable impurities, and the alloy flux-cored wire is a stainless-steel flux-cored wire for manufacturing an LNG tank, satisfying the following [Relational Expression 3]:

{Cr+Q}/{Ni+Mn+30(C+N)}>1.    [Relational Expression 3]

The stainless-steel flux-cored wire for manufacturing an LNG tank, according to the present disclosure, can be used for welding of 9% nickel steel members, high manganese steel members, and stainless-steel members by controlling the content relationship of Mo and Cr. The stainless-steel flux-cored wire has the effect of obtaining a weld metal with excellent cryogenic toughness in a welding zone.

DETAILED DESCRIPTION

Hereinafter, the present invention will be described in detail.

A flux-cored wire described in the present description can be used to manufacture an LNG tank. The flux-cored wire has an alloy sheath filled with flux.

In the present description, the term "weld metal" refers to a metal produced as a result of solidification of a molten mixture of a deposited metal and a base metal during welding.

In the present description, the term "deposited metal" refers to a metal transferred from a filler metal (i.e., wire), which is a metal material added during welding, to a weld metal zone.

According to one aspect of the present invention, there is provided a stainless-steel flux-cored wire for manufacturing an LNG tank, the flux-cored wire having a sheath in which a flux is embedded, the flux-cored wire containing predetermined weight percentages of Mn, Mo, Cr, and Ni with respect to the total weight thereof.

Mire specifically, there is provided an alloy flux-cored wire having an alloy sheath filled with flux and having a wire composition including a sheath component and a flux component embedded in the sheath component, the composition including: with respect to the flux-cored wire, 6.0 to 15.0 wt % of Ni, 13.0 to 25.0 wt % of Cr, 1.0 to 10.0 wt % of Mn, 5.0 wt % or less (except for 0 wt %) of Mo, and 0.05 to 1.0 wt % of Si, with respect to the total weight of the flux-cored wire, in which the content of C is limited to 0.5 wt % or less (except for 0 wt %), the total content of P and S is limited to 0.1 wt % or less (except for 0 wt %), at least one of $SiO_2$, $TiO_2$, and $ZrO_2$ is included in an amount of 5.0 to 18.0 wt %, at least one of $Na_2O$ and $K_2O$ is included in an amount of 0.1 to 1.0 wt %, the balance is Fe and unavoidable impurities, and the alloy flux-cored wire is a stainless steel flux-cored wire for manufacturing an LNG tank, satisfying [Relational Expression 1] given below.

{4($Na_2O+K_2O$)}/{0.5($TiO_2+SiO_2$)+0.2($ZrO_2$)}<0.5    [Relational Expression 1]:

Ni: 6.0 to 15.0 wt %

Nickel (Ni) is a component that stabilizes the austenite structure. When the content of nickel is less than 6.0 wt %, it is undesirable because the austenite structure is unstable. When the content of nickel exceeds 15.0 wt %, it is undesirable because high-temperature cracking resistance deteriorates. Therefore, the content of Ni is preferably limited to 6.0 to 15.0 wt %.

Cr: 13.0~25.0 wt %

Chromium (Cr) is a component that improves the strength of a weld metal and stabilizes the austenite structure. When the content of chrome is less than 13.0 wt %, it is not preferable because sufficient strength cannot be obtained. When the content of chrome exceeds 25.0 wt %, it is not preferable because the low-temperature impact toughness of a weld metal deteriorates. Therefore, the content of Cr is preferably limited to 13.0 to 25.0 wt %.

Mn: 1.0~10.0 wt %

Manganese (Mn) is a component that stabilizes the austenite structure and improves the deoxidation action and weldability. When the content of Mn is less than 1.0 wt %, it is not preferable because a sufficient deoxidation effect is not obtained. When the content of Mn exceeds 10.0 wt %, the segregation of the weld metal accelerates in the final solidification region, thereby lowering the melting point of the melt and deteriorating the high-temperature cracking resistance. Therefore, the content of Mn is preferably limited to 1.0 to 10.0 wt %.

Mo: 5.0 wt % or Less (Except for 0 wt %)

Molybdenum (Mo) has an effect of improving the strength of the weld metal. When the Mo content is small, it is not preferable because sufficient strength is not obtained. When the Mo content exceeds 5.0 wt %, it is not preferable because the toughness of the weld metal is deteriorated, and the segregation of Mo is accelerated, resulting in deterioration of in high temperature cracking resistance. Therefore, the content of Mo is preferably limited to the range of 5.0 wt % or less.

Si: 0.05~1.0 wt %

Silicon (Si) is a component that improves the deoxidation action and weldability. When the content of Si is less than 0.05 wt %, the deoxidation effect is insufficient. When the content Si exceeds 1.0 wt %, it is not desirable because the crack susceptibility increases according to the generation of the Laves phase. Therefore, the content of Si is preferably limited to 0.05 to 1.0 wt %.

C: 0.5 wt % or Less (Except for 0 wt %)

Carbon (C) has an effect of improving the strength of the weld metal, but there is a problem in that when it is added excessively, carbide is formed, and toughness is lowered. Therefore, the content of C is set to 0.5% or less based on the total weight of the wire. More preferably, the content of C may be set to 0.1 wt % or less to prevent deterioration of the toughness of the weld metal.

P+S: 0.1 wt % or Less (Except for 0 wt %)

Phosphorus (P) and sulfur (S) are elements that mainly affect high-temperature cracking. P and S may form compounds with low melting points, thereby causing high-temperature cracking. In the case of the present invention, the total content of P and S is preferably less than 0.1 wt %.

One or more oxides selected from $SiO_2$, $TiO_2$, and $ZrO_2$: 5.0 to 18.0 wt %

Si, Ti, and Zr oxides may be added to increase the melting point of the slag to improve the workability of full-fine welding. When the sum of the contents of Si, Ti, and Zr oxides is less than 5.0 wt %, the amount of slag is not sufficient, and the slag enveloping property is deteriorated. When it exceeds 18.0 wt %, slag peeling defects may occur. Therefore, it is desirable to limit the total content of the Si, Ti, Zr oxides to the range of 5.0 to 18.0 wt %.

One or more oxides selected from $Na_2O$ and $K_2O$: 0.1~1.0 wt %

An alkali metal oxide should be added in an amount of 0.1 wt % or more to reduce the ionization potential of the arc during welding to facilitate arc generation and to maintain a stable arc during welding. In addition, when the content of an alkali metal oxide exceeds 1.0 wt %, welding fume may be excessively generated due to high vapor pressure. Therefore, it is preferable to limit the content of the alkali metal oxide to 0.1 to 1.0 wt %. The alkali metal oxide may include either one or both of $Na_2O$ and $K_2O$.

$K_2SiF_6$, $Bi_2O_3$, $Fe_2O_3$, $Al_2O_3$, or the like may be further included. The balance may be Fe and unavoidable impurities.

On the other hand, in the stainless-steel flux-cored wire of the present invention, it is preferable to control the content of each oxide so as to satisfy [Relational Expression 1] shown below. Specifically, the control is preferably performed such that the value defined by [Relational Expression 1] is less than 0.5. When the value is 0.5 or more, the quality of the weld metal zone may be deteriorated due to deterioration of weldability and cracking characteristics.

$$\{4(Na_2O+K_2O)\}/\{0.5(TiO_2+SiO_2)+0.2(ZrO_2)\}<0.5 \quad \text{[Relational Expression 1]}$$

The stainless-steel flux-cored wire of the present invention may further include copper (Cu) in an amount of 0.5 wt % or less. Cu is a precipitation hardening element, and the content of Cu is preferably limited to 0.5 wt % or less. The content of Cu exceeding 0.5 wt %, is not preferable because hardenability increases, and thus low-temperature impact toughness is reduced.

Nitrogen (N) may be further included in an amount of 0.4 wt % or less. N is a solid solution strengthening element, and it is preferable to limit the content of N to 0.4 wt % or less. When the content of N exceeds 0.4 wt %, low-temperature impact toughness deteriorates, and a full austenite structure occurs, which is not preferable because high-temperature cracking resistance and porosity resistance deteriorate.

In the flux-cored wire of the present invention, the relationship among the contents of Mn, Cr, and Mo is adjusted to obtain the physical properties required for a weld zone. Specifically, when $\{Cr+Mo\}/\{Ni+Mn+30(C+N)\}>1$ is satisfied, the deposited metal obtained from the flux-cored wire has a yield strength of 350 MPa or more, a tensile strength of 600 MPa or more, and an elongation of 30% or more. In addition, the Charpy impact test shows that deposited metal exhibits an impact value of 27 J or more at −196° C.

Specifically, the present invention provides an alloy flux-cored wire having an alloy sheath filled with flux, wherein a wire composition including a sheath component and a flux component embedded in the sheath component includes, with respect to the total weight of the flux-cored wire, 6.0 to 15.0 wt % of Ni, 13.0 to 25.0 wt % of Cr, 1.0 to 10.0 wt % of Mn, and 0.05 to 1.0 wt % of Si, in which the content of C is limited to 0.5 wt % or less (except for 0 wt %), the total content of P and S is limited to 0.1 wt % or less (except for 0 wt %), at least one of $SiO_2$, $TiO_2$, and $ZrO_2$ is included in an amount of 5.0 to 18.0 wt %, at least one of $Na_2O$ and $K_2O$ is included in an amount of 0.1 to 1.0 wt %, at least one element selected from the group consisting of Mo, W, and Nb is included in an amount of 0.1 to 5.0 wt %, the balance is Fe and unavoidable impurities, and the alloy flux-cored wire is a stainless steel flux-cored wire for manufacturing an LNG tank, satisfying [Relational Expression 1 shown below.

$$\{4(Na_2O+K_2O)\}/\{0.5(TiO_2+SiO_2)+0.2(ZrO_2)\}<0.5 \quad \text{[Relational Expression 1]}$$

Mo, W, and Nb have an effect of improving the strength of the weld metal, and at least one of them may be selectively included. When the content of at least one element selected from the group consisting of Mo, W, and Nb is less than 0.1 wt %, sufficient strength is not obtained, which is not preferable. When the content of at least one element selected from the group consisting of Mo, W, and Nb exceeds 5.0 wt %, the toughness of the weld metal deteriorates, and high temperature cracking resistance deteriorates, which is undesirable. Therefore, the content thereof is preferably limited to 0.1 to 5.0 wt %.

Specifically, the stainless-steel flux-cored wire of the present invention may further include W in an amount of 2.0 wt % or less instead of Mo. Tungsten (W) has the same effect as Mo. That is, W and Mo improve the strength of the weld metal. When the content of W exceeds 2.0 wt %, the toughness of the weld metal may deteriorate. Therefore, the content of W is preferably limited to the range of 2.0 wt % or less.

In addition, the stainless-steel flux-cored wire of the present invention may further include Nb in an amount of 1.5 wt % or less instead of Mo. Niobium (W) has the same effect as Mo. That is, Ni and Mo improve the strength of the weld metal. When the content of Nb exceeds 1.5 wt %, the toughness of the weld metal may deteriorate. Therefore, the content of Nb is preferably limited to the range of 1.5 wt % or less.

According to another aspect of the present invention, there is provided an alloy flux-cored wire having an alloy sheath filled with a flux, wherein a deposited metal obtained from the flux-cored wire includes 8.0 to 14.0 wt % of Ni, 15.0 to 23.0 wt % of Cr, 1.0 to 8.0 wt % of Mn, 4.0 wt % or less (except for 0 wt %) of Mo, 0.05 to 1.0 wt % of Si, and 0.01 to 0.5 wt % of C and N, in which the total content of P and S is limited to 0.1 wt % or less (except for 0 wt %), the balance includes Fe and unavoidable impurities, and the alloy flux-cored wire is a stainless steel flux-cored wire for manufacturing an LNG tank, satisfying [Relational Expression 2] given below.

$$\{Cr+Mo\}/\{Ni+Mn+30(C+N)\}>1 \quad \text{[Relational Expression 2]}$$

Depending on the alloy composition of the flux-cored wire, the properties of the obtained deposited metal vary. In particular, whether to obtain the properties for use in the manufacture of an LNG tank is determined. With the use of the flux-cored wire according to the present invention, it is possible to obtain a deposited metal having excellent strength, toughness, and impact value. Each component may be initially contained in the alloy sheath or may be added from metal powder and alloy powder of the flux.

Nickel (Ni) is a component that stabilizes the austenite structure. When the content of nickel is less than 8.0 wt %, it is undesirable because the austenite structure is unstable. When the content of nickel exceeds 14.0 wt %, it is undesirable because high-temperature cracking resistance deteriorates. Therefore, the content of Ni is preferably limited to the range of 8.0 to 14.0 wt %.

Chromium (Cr) is a component that improves the strength of a weld metal and stabilizes the austenite structure. When the content of chrome is less than 15.0 wt %, it is not preferable because sufficient strength cannot be obtained. When the content of chrome exceeds 23.0 wt %, it is not preferable because the low-temperature impact toughness of a weld metal deteriorates. Therefore, the content of Cr is preferably limited to the range of 15.0 to 23.0 wt %.

Manganese (Mn) is a component that stabilizes the austenite structure and improves the deoxidation action and weldability. When the content of Mn is less than 1.0 wt %, it is not preferable because a sufficient deoxidation effect is not obtained. When the content of Mn exceeds 8.0 wt %, the segregation of the weld metal accelerates in the final solidification region, resulting in deterioration in the high-temperature cracking resistance. Therefore, the content of Mn is preferably limited to the range of 1.0 to 8.0 wt %.

Molybdenum (Mo) has an effect of improving the strength of the weld metal. When the Mo content is small, it is not preferable because sufficient strength is not obtained. When the Mo content exceeds 4.0 wt %, it is not preferable because the toughness of the weld metal deteriorates, and the segregation accelerates, resulting in deterioration of in high-temperature cracking resistance. Therefore, the content of Mo is preferably limited to the range of 4.0 wt % or less.

When the content of Si is less than 0.05 wt %, the deoxidation effect is insufficient. When the content of Si exceeds 1.0 wt %, it is not desirable because the crack susceptibility increases according to the generation of the Laves phase. Therefore, the content of Si is preferably limited to the range of 0.05 to 1.0 wt %.

Carbon (C) has an effect of improving the strength of the weld metal, but there is a problem in that when it is added excessively, carbide is formed, and toughness is lowered. N is a solid solution strengthening element, and when it is added excessively, low-temperature impact toughness deteriorates, and a full austenite structure occurs, which is not preferable because high-temperature cracking resistance and porosity resistance deteriorate. Therefore, the total content of C and N is preferably limited to the range of 0.01 to 0.5 wt %.

Phosphorus (P) and sulfur (S) are elements that mainly affect high-temperature cracking. P and S may form compounds with low melting points, thereby causing high-temperature cracking. In the case of the present invention, the total content of P and S is preferably less than 0.1 wt %.

The deposited metal obtained from the stainless-steel flux-cored wire of the present invention may further include copper (Cu) in an amount of 0.5 wt % or less. Cu is a precipitation hardening element, and the content of Cu is preferably limited to the range of 0.5 wt % or less. The content of Cu exceeding 0.5 wt % is not preferable because hardenability increases, and thus low-temperature impact toughness is reduced.

On the other hand, in the stainless-steel flux-cored wire of the present invention, and the deposited metal obtained from the wire, it is preferable to control the content of each component so as to satisfy [Relational Expression 2] shown below.

$$\{Cr+Mo\}/\{Ni+Mn+30(C+N)\}>1. \quad \text{[Relational Expression 2]}$$

Specifically, the control is preferably performed such that the value defined by Relational Expression 2 exceeds 1. When the value is 1 or less, it is difficult to secure strength and cryogenic toughness (i.e., an impact-related value), resulting in deterioration in the quality of the weld metal zone.

Further, there is provided an alloy flux-cored wire having a sheath filled with flux, in which a deposited metal obtained from the alloy-fluxed wire includes 8.0 to 14.0 wt % of Ni, 15.0 to 23.0 wt % of Cr, 1.0 to 8.0 wt % of Mn, 0.05 to 1.0 wt % of Si, and 0.01 to 0.5 wt % of C and N, in which the total content of P and S is limited to the range of 0.1 wt % or less (except for 0 wt %), at least element selected from the group (Q) consisting of Mo, W, and Nb is included in an amount of 0.1 to 4.0 wt %, and the balance is Fe and unavoidable impurities, and the alloy flux-cored wire is a stainless steel flux-cured wire for manufacturing an LNG tank, satisfying [Relational Expression 3] given below.

$$\{Cr+Q\}/\{Ni+Mn+30(C+N)\}>1 \quad \text{[Relational Expression 3]}$$

In the case where the composition further includes W or Nb or in the case where Mo is replaced with W or Nb, it is preferable that the stainless-steel flux-cored wire of the present invention or the deposited metal obtained from the wire satisfies Relational Expression 3 shown below. In Relational Expression 3, Q may be any one of Mo, [Mo+W], [Mo+Nb], [Mo+W+Nb], W, Nb, and [W+Nb]. More preferably, Relational Expression 3 may be $1.5>\{Cr+Q\}/\{Ni+Mn+30(C+N)\}>1$. When the value of Relational Expression 3 is 1.5 or greater or is 1 or less or less, it is difficult to secure strength and cryogenic toughness (i.e., an impact-related value), resulting in deterioration in the quality of the weld metal zone.

Specifically, the deposited metal obtained from the stainless-steel flux-cored wire of the present invention through welding may further include W in an amount of 2.0 wt % or less instead of Mo. Tungsten (W) has the same effect as Mo. That is, W and Mo improve the strength of the weld metal. When the content of W exceeds 2.0 wt %, the toughness of the weld metal may deteriorate. Therefore, the content of W is preferably limited to the range of 2.0 wt % or less.

Specifically, the deposited metal obtained from the stainless-steel flux-cored wire of the present invention through welding may further include Nb in an amount of 1.5 wt % or less instead of Mo. Niobium (W) has the same effect as Mo. That is, Ni and Mo improve the strength of the weld metal. When the content of Nb exceeds 1.5 wt %, the toughness of the weld metal may deteriorate. Therefore, the content of Nb is preferably limited to the range of 1.5 wt % or less.

In connection with the stainless steel flux-cored wire according to the present invention, the physical properties of the weld metal zone according to the relationship between the contents of Cr, Mo, and Mn will be described in detail with reference to Examples and Comparative Examples described below, but the scope of the present invention is not limited by the examples.

A stainless steel flux-cored arc welding wire including the components shown in Table 1 was prepared.

TABLE 1

|  | Ni | Cr | Mn | Mo | Cu | Si | C | N | P + S | W | Nb | Expression 1 | Expression 2 |
|---|---|---|---|---|---|---|---|---|---|---|---|---|---|
| 1 | 7.61 | 16.47 | 5.69 | 1.95 | 0 | 0.83 | 0.015 | 0 | 0.03 | 0 | 0 | 0.28 | 1.34 |
| 2 | 7.60 | 16.57 | 8.14 | 1.93 | 0 | 0.81 | 0.015 | 0 | 0.03 | 0 | 0 | 0.28 | 1.14 |
| 3 | 7.95 | 19.07 | 6.75 | 1.25 | 0 | 0.80 | 0.015 | 0 | 0.03 | 0 | 0 | 0.31 | 1.14 |
| 4 | 8.04 | 16.14 | 6.79 | 1.05 | 0 | 0.79 | 0.015 | 0 | 0.03 | 0 | 0 | 0.40 | 1.13 |
| 5 | 7.61 | 16.47 | 5.69 | 1.73 | 0 | 0.83 | 0.015 | 0 | 0.03 | 0.57 | 0 | 0.28 | 1.32 |
| 6 | 7.72 | 16.24 | 6.07 | 0 | 0 | 0.79 | 0.015 | 0 | 0.03 | 1.95 | 0 | 0.33 | 1.14 |
| 7 | 7.69 | 16.43 | 5.71 | 1.69 | 0 | 0.81 | 0.015 | 0 | 0.03 | 0 | 0.59 | 0.42 | 1.31 |
| 8 | 7.88 | 16.02 | 5.76 | 0 | 0 | 0.85 | 0.015 | 0 | 0.03 | 0 | 1.07 | 0.39 | 1.14 |
| 9 | 7.61 | 15.93 | 5.63 | 1.63 | 0 | 0.79 | 0.015 | 0 | 0.03 | 0.39 | 0.27 | 0.29 | 1.28 |
| 10 | 7.60 | 15.93 | 6.23 | 0 | 0 | 0.86 | 0.015 | 0 | 0.04 | 1.37 | 0.54 | 0.39 | 1.12 |
| 11 | 7.49 | 17.18 | 5.19 | 1.41 | 0 | 0.78 | 0.015 | 0 | 0.03 | 0 | 0 | 0.75 | 1.42 |
| 12 | 7.29 | 11.68 | 6.67 | 1.25 | 0 | 0.79 | 0.015 | 0 | 0.04 | 0 | 0 | 0.32 | 0.90 |
| 13 | 7.61 | 16.17 | 6.19 | 7.00 | 0 | 0.80 | 0.015 | 0 | 0.04 | 0 | 0 | 0.34 | 1.63 |
| 14 | 15.37 | 15.97 | 6.93 | 1.25 | 0 | 0.79 | 0.015 | 0 | 0.03 | 0 | 0 | 0.37 | 0.76 |

TABLE 1-continued

|    | Ni   | Cr    | Mn    | Mo   | Cu | Si   | C     | N    | P + S | W    | Nb   | Expression 1 | Expression 2 |
|----|------|-------|-------|------|----|------|-------|------|-------|------|------|--------------|--------------|
| 15 | 7.61 | 16.19 | 6.94  | 1.25 | 0  | 0.77 | 0.107 | 0.26 | 0.03  | 0    | 0    | 0.32         | 0.68         |
| 16 | 6.17 | 18.19 | 5.95  | 3.91 | 0  | 0.84 | 0.015 | 0    | 0.03  | 0    | 0    | 0.44         | 1.76         |
| 17 | 7.94 | 16.21 | 9.08  | 1.13 | 0  | 0.85 | 0.015 | 0    | 0.04  | 0    | 0    | 0.33         | 0.99         |
| 18 | 7.67 | 16.00 | 10.75 | 5.17 | 0  | 0.79 | 0.015 | 0    | 0.04  | 0    | 0    | 0.40         | 1.12         |
| 19 | 7.11 | 12.19 | 6.75  | 6.64 | 0  | 0.80 | 0.015 | 0    | 0.03  | 0    | 0    | 0.31         | 1.32         |
| 20 | 7.86 | 25.73 | 10.61 | 1.25 | 0  | 0.83 | 0.015 | 0    | 0.03  | 0    | 0    | 0.33         | 1.43         |
| 21 | 7.56 | 16.41 | 5.53  | 1.89 | 0  | 0.83 | 0.015 | 0    | 0.03  | 2.91 | 0    | 0.27         | 1.35         |
| 22 | 7.66 | 16.57 | 5.58  | 0    | 0  | 0.83 | 0.015 | 0    | 0.03  | 2.23 | 0    | 0.28         | 1.21         |
| 23 | 7.59 | 16.51 | 5.67  | 1.94 | 0  | 0.83 | 0.015 | 0    | 0.03  | 0    | 1.67 | 0.28         | 1.35         |
| 24 | 7.69 | 16.69 | 5.71  | 0    | 0  | 0.83 | 0.015 | 0    | 0.03  | 0    | 1.93 | 0.29         | 1.21         |
| 25 | 7.19 | 17.01 | 10.18 | 1.93 | 0  | 0.79 | 0.015 | 0    | 0.03  | 2.19 | 0    | 0.28         | 1.06         |
| 26 | 7.59 | 16.37 | 10.09 | 0    | 0  | 0.80 | 0.015 | 0    | 0.03  | 2.86 | 0    | 0.35         | 0.90         |
| 27 | 7.64 | 16.97 | 10.91 | 1.94 | 0  | 0.81 | 0.015 | 0    | 0.02  | 0    | 1.56 | 0.29         | 1.00         |
| 28 | 6.91 | 17.54 | 10.05 | 0    | 0  | 0.81 | 0.015 | 0    | 0.03  | 0    | 1.97 | 0.31         | 1.01         |

Flux cored arc welding (FCAW) was performed with each welding material. In the case of FCAW, welding was performed with a heat input of 8.0 to 12.0 KJ/cm in a 100% $CO_2$ protective gas ambient. A wire having a diameter of 1.2 mm was used for the FCAW. A bevel was formed such that a bevel angle of a 9% Ni steel plate with a plate thickness of 20 mm, which is one of the base materials for manufacturing an LNG tank, with respect to a bevel face became 22.5°. Next, the base metals were arranged so that the root gap became 12 mm, and the same steel material as the base material was disposed on the side (root side) where the bevel was narrowed. With this bevel, welding was performed, and a weld joint was formed.

Visual inspection was performed for the arc stability of the weld joint, slag peelability, crack resistance of the weld joint, and the porosity on the outer surface of the bead. The results of the inspection were evaluated by four classes: ◎ (excellent), ○ (good), Δ (poor), X (fail). The results are shown in Table 2 below.

TABLE 2

|    | Crack resistance | Arc stability | Bead appearance | Slag peeling | Ratio of cracks (%) |
|----|------------------|---------------|-----------------|--------------|---------------------|
| 1  | ◎ | ◎ | ◎ | ◎ | 0  |
| 2  | ◎ | ○ | ○ | ◎ | 0  |
| 3  | ◎ | ◎ | ◎ | ◎ | 0  |
| 4  | ◎ | ◎ | ◎ | ◎ | 0  |
| 5  | ○ | ◎ | ◎ | ◎ | 4  |
| 6  | ◎ | ◎ | ◎ | ◎ | 0  |
| 7  | ○ | ◎ | ◎ | ◎ | 5  |
| 8  | ◎ | ◎ | ◎ | ◎ | 0  |
| 9  | ○ | ◎ | ◎ | ◎ | 7  |
| 10 | ◎ | ◎ | ◎ | ◎ | 0  |
| 11 | ◎ | Δ | Δ | Δ | 0  |
| 12 | Δ | ◎ | ◎ | ◎ | 45 |
| 13 | ○ | ◎ | ◎ | ◎ | 17 |
| 14 | Δ | ◎ | ◎ | ◎ | 40 |
| 15 | ○ | ◎ | ◎ | ◎ | 13 |
| 16 | ○ | ◎ | ◎ | ◎ | 9  |
| 17 | ◎ | ◎ | ◎ | ◎ | 0  |
| 18 | ○ | ○ | ○ | ○ | 12 |
| 19 | ◎ | ◎ | ◎ | ◎ | 0  |
| 20 | ○ | ○ | ○ | ○ | 11 |
| 21 | ○ | ◎ | ◎ | ◎ | 7  |
| 22 | ◎ | ◎ | ◎ | ◎ | 0  |
| 23 | ○ | ◎ | ◎ | ◎ | 9  |
| 24 | ◎ | ◎ | ◎ | ◎ | 0  |
| 25 | ○ | ○ | ○ | ◎ | 9  |
| 26 | ◎ | ○ | ◎ | ◎ | 0  |
| 27 | ○ | ○ | ○ | ◎ | 10 |
| 28 | ◎ | ○ | ○ | ◎ | 0  |

Referring to Table 2, it was confirmed that in the case of No. 11 that did not satisfy Relational Expression 1, arc stability and bead appearance were not satisfactory. In addition, it was confirmed that in the case of Nos. 12, 14, and 16 that did not satisfy Relational Expression 2, the crack ratio was high. It was confirmed that cracks were generated in the case of Nos. 20 and 27 depending on the range of Mn.

The results of measuring the yield strength (YS), tensile strength (TS), elongation (EL), and Charpy impact energy (at −196° C.) of the weld joint obtained thereafter are shown in Table 3 below.

TABLE 3

|    | YS (MPa) | TS (MPa) | Elongation (%) | CVM Impact (J@ −196° C.) |
|----|----------|----------|----------------|--------------------------|
| 1  | 452 | 707 | 40 | 39 |
| 2  | 426 | 701 | 39 | 38 |
| 3  | 435 | 651 | 40 | 45 |
| 4  | 427 | 647 | 40 | 44 |
| 5  | 468 | 729 | 38 | 37 |
| 6  | 451 | 697 | 38 | 37 |
| 7  | 461 | 723 | 39 | 38 |
| 8  | 439 | 689 | 39 | 38 |
| 9  | 487 | 731 | 38 | 36 |
| 10 | 437 | 702 | 39 | 37 |
| 11 | 430 | 657 | 40 | 42 |
| 12 | 370 | 530 | 43 | 45 |
| 13 | 549 | 767 | 30 | 24 |
| 14 | 364 | 614 | 41 | 44 |
| 15 | 394 | 637 | 43 | 43 |
| 16 | 504 | 727 | 37 | 29 |
| 17 | 405 | 626 | 40 | 43 |
| 18 | 461 | 694 | 31 | 23 |
| 19 | 394 | 627 | 34 | 26 |
| 20 | 483 | 741 | 29 | 22 |
| 21 | 467 | 729 | 37 | 34 |
| 22 | 449 | 703 | 39 | 37 |
| 23 | 471 | 738 | 35 | 33 |
| 24 | 457 | 699 | 40 | 38 |
| 25 | 461 | 709 | 34 | 27 |
| 26 | 428 | 667 | 36 | 31 |
| 27 | 459 | 710 | 35 | 29 |
| 28 | 419 | 671 | 36 | 32 |

Referring to Table 3, it was confirmed that the yield strength, tensile strength, and especially the impact value was low in the case of Nos. 12 to 20 which did not satisfy Relational Expression 2. On the other hand, in the case of Nos. 1 to 10 corresponding to the composition range of the present invention, it was possible to secure a yield strength of 420 MPa or more, a tensile strength of 650 MPa or more, an elongation of 38% or more, and an impact value of 35 J or more.

In addition, a stainless-steel flux-cored wire having the components shown in Table 4 was prepared according to Relational Expression 3 related to the content of Mo, W, or Nb. The results of the evaluation of the properties of the weld joint after performing welding are shown in Table 5 below.

TABLE 4

|    | Ni   | Cr    | Mn    | Mo   | Cu | Si   | C     | N | P + S | W    | Nb   | Expression 3 |
|----|------|-------|-------|------|----|------|-------|---|-------|------|------|--------------|
| 5  | 7.61 | 16.47 | 5.69  | 1.73 | 0  | 0.83 | 0.015 | 0 | 0.03  | 0.57 | 0    | 1.37 |
| 6  | 7.72 | 16.24 | 6.07  | 0    | 0  | 0.79 | 0.015 | 0 | 0.03  | 1.95 | 0    | 1.28 |
| 7  | 7.69 | 16.43 | 5.71  | 1.69 | 0  | 0.81 | 0.015 | 0 | 0.03  | 0    | 0.59 | 1.35 |
| 8  | 7.88 | 16.02 | 5.76  | 0    | 0  | 0.85 | 0.015 | 0 | 0.03  | 0    | 1.07 | 1.21 |
| 9  | 7.61 | 15.93 | 5.63  | 1.63 | 0  | 0.79 | 0.015 | 0 | 0.03  | 0.39 | 0.27 | 1.33 |
| 10 | 7.60 | 15.93 | 6.23  | 0    | 0  | 0.86 | 0.015 | 0 | 0.04  | 1.37 | 0.54 | 1.25 |
| 21 | 7.56 | 16.41 | 5.53  | 1.89 | 0  | 0.83 | 0.015 | 0 | 0.03  | 2.91 | 0    | 1.57 |
| 22 | 7.66 | 16.57 | 5.58  | 0    | 0  | 0.83 | 0.015 | 0 | 0.03  | 2.23 | 0    | 1.37 |
| 23 | 7.59 | 16.51 | 5.67  | 1.94 | 0  | 0.83 | 0.015 | 0 | 0.03  | 0    | 1.67 | 1.47 |
| 24 | 7.69 | 16.69 | 5.71  | 0    | 0  | 0.83 | 0.015 | 0 | 0.03  | 0    | 1.93 | 1.34 |
| 25 | 7.19 | 17.01 | 10.18 | 1.93 | 0  | 0.79 | 0.015 | 0 | 0.03  | 2.19 | 0    | 1.19 |
| 26 | 7.59 | 16.37 | 10.09 | 0    | 0  | 0.80 | 0.015 | 0 | 0.03  | 2.86 | 0    | 1.06 |
| 27 | 7.64 | 16.97 | 10.91 | 1.94 | 0  | 0.81 | 0.015 | 0 | 0.02  | 0    | 1.56 | 1.08 |
| 28 | 6.91 | 17.54 | 10.05 | 0    | 0  | 0.81 | 0.015 | 0 | 0.03  | 0    | 1.97 | 1.12 |
| 29 | 7.95 | 16.19 | 5.93  | 5.23 | 0  | 0.81 | 0.015 | 0 | 0.03  | 0.15 | 0    | 1.51 |
| 30 | 7.59 | 15.95 | 6.05  | 5.07 | 0  | 0.48 | 0.015 | 0 | 0.03  | 2.13 | 0    | 1.64 |
| 31 | 7.95 | 16.17 | 5.89  | 5.14 | 0  | 0.81 | 0.015 | 0 | 0.03  | 0    | 1.67 | 1.61 |
| 32 | 7.62 | 15.81 | 5.91  | 5.08 | 0  | 0.81 | 0.015 | 0 | 0.04  | 2.07 | 1.59 | 1.76 |
| 33 | 7.18 | 16.84 | 5.59  | 2.05 | 0  | 0.83 | 0.015 | 0 | 0.03  | 2.19 | 0    | 1.59 |
| 34 | 7.57 | 17.2  | 15.94 | 1.97 | 0  | 0.86 | 0.015 | 0 | 0.03  | 0    | 1.83 | 1.51 |
| 35 | 7.17 | 16.9  | 15.84 | 1.88 | 0  | 0.83 | 0.015 | 0 | 0.03  | 2.23 | 1.74 | 1.69 |

TABLE 5

|    | Expression 3 | Yield strength (MPa) | Tensile strength (MPa) | Elongation (%) | CVM Impact (J@ −196° C.) |
|----|------|-----|-----|----|----|
| 5  | 1.37 | 468 | 729 | 38 | 37 |
| 6  | 1.28 | 451 | 697 | 38 | 37 |
| 7  | 1.35 | 461 | 723 | 39 | 38 |
| 8  | 1.21 | 439 | 689 | 39 | 38 |
| 9  | 1.33 | 487 | 731 | 38 | 36 |
| 10 | 1.25 | 437 | 702 | 39 | 37 |
| 21 | 1.57 | 467 | 729 | 37 | 34 |
| 22 | 1.37 | 449 | 703 | 39 | 37 |
| 23 | 1.47 | 471 | 738 | 35 | 33 |
| 24 | 1.34 | 457 | 699 | 40 | 38 |
| 25 | 1.19 | 461 | 709 | 34 | 27 |
| 26 | 1.06 | 428 | 667 | 36 | 31 |
| 27 | 1.08 | 459 | 710 | 35 | 29 |
| 28 | 1.12 | 419 | 671 | 36 | 32 |
| 29 | 1.51 | 479 | 747 | 32 | 24 |
| 30 | 1.64 | 484 | 759 | 30 | 25 |
| 31 | 1.61 | 481 | 755 | 31 | 26 |
| 32 | 1.76 | 493 | 763 | 29 | 22 |
| 33 | 1.59 | 461 | 721 | 36 | 33 |
| 34 | 1.51 | 457 | 741 | 34 | 31 |
| 35 | 1.69 | 462 | 732 | 34 | 30 |

Referring to Tables 4 and 5, it was confirmed that when the W or Nb which was added additionally or added for substitution of Mn, when the value of the relationship between Mn and either W or Nb was in the range of 25 to 28 that were outside the composition range of the present invention, the low impact value was low. In addition, in the case of the value in the range 29 to 35 that did not satisfy Relational Expression 3, it was confirmed that the impact value was also low. Therefore, it is confirmed that when adding W and Nb additionally or adding Mo instead of Mo, it is preferable to adjust the content ratio of the components according to Relational Expression 5.

The stainless-steel flux-cored wire according to the present invention is characterized in that it is possible to obtain a weld metal having excellent strength and cryogenic impact toughness from the stainless-steel flux-cored wire because the contents of Mo and Cr are suitably controlled while limiting the content of manganese to the range of 10 wt % or less. The stainless-steel flux-cored wire according to the present invention can be applicable to welding of 9% nickel steel, high manganese steel, and stainless steel, and has an advantageous effect of obtain a weld metal having excellent cryogenic toughness in the weld zone.

The foregoing has broadly described the features and technical advantages of the present invention so that the appended claims can be better understood. The ordinarily skilled people in this art will appreciate that the present invention can be implemented in other different forms without departing from the technical spirit or essential characteristics of the exemplary embodiments. Therefore, it can be understood that the examples described above are only for illustrative purposes and are not restrictive in all aspects. The scope of the present invention is defined by the following claims rather than the above detailed description, and all changes or modifications derived from the meaning and scope of the claims and their equivalent concepts should be interpreted as falling into the scope of the present invention.

What is claimed:
1. An alloy flux-cored wire including an alloy sheath filled with flux, wherein a deposited metal obtained from the flux-cored wire comprises:
  8.0 to 14.0 wt % of Ni,
  15.0 to 23.0 wt % of Cr,
  5.63 to 8.0 wt % of Mn, at least one of $SiO_2$, $TiO_2$, $ZrO_2$, $Na_2O$ and $K_2O$,
one or both of W present in an amount of at least 0.39 wt % and Nb present in an amount of at least 0.27 wt %,
Mo present such that a combined amount of Mo with W and/or Nb is no greater than 4 wt %,
0.05 to 1.0 wt % of Si,
C and N present in a combined amount from 0.01 to 0.5 wt %,
P and S present such that a total content of P and S is limited to 0.1 wt % or less, and
the balance consists of Fe and unavoidable impurities,
wherein the alloy flux-cored wire is a stainless steel flux-cored wire for manufacturing an LNG tank, satisfying the following: $1.5>\{Cr+Mo\}/\{Ni+Mn+30(C+N)\}>1$.

2. An alloy flux-cored wire including an alloy sheath filled with flux, wherein a deposited metal obtained from the flux-cored wire comprises:
8.0 to 14.0 wt % of Ni,
15.0 to 23.0 wt % of Cr,
5.63 to 8.0 wt % of Mn,
0.05 to 1.0 wt % of Si,
at least one of $SiO_2$, $TiO_2$, $ZrO_2$, $Na_2O$ and $K_2O$,
0.01 to 0.5 wt % of C and N,
P and S present such that a total content of P and S is limited to a range of 0.1 wt % or less,
at least two elements defining a group (Q), the at least two elements selected from the group consisting of Mo with W in which W is present in an amount of at least 0.39 wt %, Mo with Nb in which Nb is present in an amount of at least 0.27 wt %, and Mo with W and Nb in which W is present in an amount of at least 0.39 wt % and Nb is present in an amount of at least 0.27 wt %, the at least two elements defining the group (Q) being present in an amount no greater than 4.0 wt %, and
the balance consists of Fe and unavoidable impurities,
wherein the alloy flux-cored wire is a stainless steel flux-cored wire for manufacturing an LNG tank, satisfying the following: $1.5>\{Cr+Q\}/\{Ni+Mn+30(C+N)\}>1$.

3. The alloy flux-cored wire of claim 1, wherein the deposited metal obtained from the flux-cored wire includes at least one of $SiO_2$, $TiO_2$, and $ZrO_2$ in an amount of 5.0 to 18.0 wt %, and at least one of $Na_2O$ and $K_2O$ in an amount of 0.1 to 1.0 wt %, and the alloy flux-cored wire further satisfies the following: $\{4(Na_2O+K_2O)\}/\{0.5(TiO_2+SiO_2)+0.2(ZrO_2)\}<0.5$.

4. The alloy flux-cored wire of claim 2, wherein the deposited metal obtained from the flux-cored wire includes at least one of $SiO_2$, $TiO_2$, and $ZrO_2$ included in an amount of 5.0 to 18.0 wt %, at least one of $Na_2O$ and $K_2O$ is included in an amount of 0.1 to 1.0 wt %, and the alloy flux-cored wire further satisfying the following: $\{4(Na_2O+K_2O)\}/\{0.5(TiO_2+SiO_2)+0.2(ZrO_2)\}<0.5$.

5. An alloy flux-cored wire including an alloy sheath filled with flux, wherein a wire composition including a sheath component and a flux component embedded in the sheath component comprises:
6.0 to 15.0 wt % of Ni,
13.0 to 25.0 wt % of Cr,
5.63 to 10.0 wt % of Mn,
0.05 to 1.0 wt % of Si,
at least one of $SiO_2$, $TiO_2$, $ZrO_2$, $Na_2O$ and $K_2O$,
0.5 wt % or less of C, and N,
P and S present such that a total content of P and S is limited to a range of 0.1 wt % or less,
at least two elements defining a group (Q), the at least two elements selected from the group consisting of Mo with W in which W is present in an amount of at least 0.39 wt %, Mo with Nb in which Nb is present in an amount of at least 0.27 wt %, and Mo with W and Nb in which W is present in an amount of at least 0.39 wt % and Nb is present in an amount of at least 0.27 wt %, the at least two elements defining the group (Q) being present in an amount no greater than 4.0 wt %, and
Fe and unavoidable impurities,
wherein the alloy flux-cored wire is a stainless steel flux-cored wire for manufacturing an LNG tank, satisfying the following: $1.5>\{Cr+Q\}/\{Ni+Mn+30(C+N)\}>1$.

6. The alloy flux-cored wire of claim 2, wherein the wire composition includes at least one of $SiO_2$, $TiO_2$, and $ZrO_2$ in an amount of 5.0 to 18.0 wt %, at least one of $Na_2O$ and $K_2O$ is included in an amount of 0.1 to 1.0 wt %, and the alloy flux-cored wire further satisfies the following: $\{4(Na_2O+K_2O)\}/\{0.5(TiO_2+SiO_2)+0.2(ZrO_2)\}<0.5$.

7. The alloy flux-cored wire of claim 5, wherein the wire composition includes at least one of $SiO_2$, $TiO_2$, and $ZrO_2$ in an amount of 5.0 to 18.0 wt %, at least one of $Na_2O$ and $K_2O$ is included in an amount of 0.1 to 1.0 wt %, and the alloy flux-cored wire further satisfies the following: $\{4(Na_2O+K_2O)\}/\{0.5(TiO_2+SiO_2)+0.2(ZrO_2)\}<0.5$.

* * * * *